United States Patent [19]

Yamaji et al.

[11] Patent Number: 4,548,186
[45] Date of Patent: Oct. 22, 1985

[54] METHOD AND DEVICE FOR PREHEATING AN ENGINE OR AN ENGINE INTAKE AIR

[75] Inventors: Katsuhiko Yamaji; Yasushi Nakata, both of Osaka; Shigeyuki Kawai, Takarazuka; Tatumi Hagihara, Hiroshima; Koji Kageyama, Hiroshima; Yasushi Okazaki, Hiroshima, all of Japan

[73] Assignees: Sekisui Kagaku Kogyo Kabushiki Kaisha, Osaka; Mazda Motor Corporation, Hiroshima, both of Japan

[21] Appl. No.: 647,824

[22] Filed: Sep. 5, 1984

[30] Foreign Application Priority Data

Sep. 5, 1983 [JP] Japan ................................ 58-163857
Sep. 5, 1983 [JP] Japan ................................ 58-163858

[51] Int. Cl.⁴ ............................................ F02M 31/00
[52] U.S. Cl. ................................... 123/556; 123/553; 165/104.12
[58] Field of Search .................. 123/556, DIG. 12, 3, 123/527, 553; 126/263; 165/104.12

[56] References Cited

U.S. PATENT DOCUMENTS

| | | | |
|---|---|---|---|
| 3,872,839 | 3/1975 | Russell | 123/557 |
| 4,050,430 | 9/1977 | Amagai | 123/556 |
| 4,056,086 | 11/1977 | Ueno | 123/546 |
| 4,122,679 | 10/1978 | Charron | 123/556 |
| 4,214,699 | 7/1980 | Buchner | 165/104.12 |
| 4,365,475 | 12/1982 | Dunlap | 165/104.12 |
| 4,365,606 | 12/1982 | Endo | 123/556 |
| 4,402,915 | 9/1983 | Nishizaki | 165/104.12 |

Primary Examiner—Ronald H. Lazarus
Attorney, Agent, or Firm—Wenderoth, Lind & Ponack

[57] ABSTRACT

The present invention provides an engine intake air preheating device having
(A) an intake air preheater for preheating air to be fed into an engine, the preheater including a first metal hydride and being disposed within an intake air feeding tube for heat exchange with the intake air,
(B) a hydrogen storage container including hydrogen or a second metal hydride, and
(C) a pipe having a valve and connecting the intake air preheater to the hydrogen storage container so that hydrogen can move between them;
and also an engine preheating device having
(A') an engine preheater for preheating an engine, the preheater including a first metal hydride and being mounted on the engine for heat-exchange with the engine,
(B) the hydrogen storage container, and
(C) the pipe.

There is also provided a method for preheating intake air at the time of starting the engine using an engine intake air preheating device such as the one according to the present invention.

8 Claims, 9 Drawing Figures

METHOD AND DEVICE FOR PREHEATING AN ENGINE OR AN ENGINE INTAKE AIR

This invention relates to a method and a device for pre-heating an engine or an engine intake air. More specifically, this invention relates to a method and a device for pre-heating an engine or an engine intake air using as a heat source the heat which is released from a hydrogen absorbing-dissolving material when it absorbs hydrogen.

Generally, in cold districts or in the early morning in the wintertime in other districts as well, the temperature goes down below the freezing point. At such a time, it takes time to start an engine, and some time period is required until the inside of a car is warmed up full after the starting of the engine.

In particular, the starting of a diesel engine is effected not by the spark ignition method involving using an ignition plug, but by the compression ignition method which comprises compressing air in a cylinder to a compression ratio of 16–24 to elevate its temperature to 600°–800° C., and jetting a fuel oil into the cylinder to ignite and burn the fuel oil. Hence, the starting of the diesel engine essentially requires preheating the intake air to a predetermined temperature. It has been the previous practice to pre-heat air to be supplied to an engine by using an electric heater having a battery as a power supply. The capacity of the battery, however, is not high enough to pre-heat the intake air rapidly. On the other hand, increasing the size of the battery results in an extreme increase in its weight.

Some period of time is required to warm the inside of a car after the starting of the engine until the driver and passengers become comfortable. To shorten the warming time, it has been proposed to warm the inside of the car by burning a fuel in a burner or electrically heating it by a heating coil or the like. This also requires a fuel or electrical energy. A method was previously proposed in which an automobile is warmed by transferring hydrogen from a low temperature hydride storage tank to a high temperature hydride storage tank to generate heat without the need for a fuel or an electrical energy, and utilizing the resulting heat for heating cooling water or the space inside the car (see Japanese Laid-Open Patent Publication No. 160,288/1980).

This Japanese patent document, however, gives no description or suggestion even of the possibility of using the heat generated by hydrogn transfer for preheating an engine or an engine intake air.

It is an object of this invention therefore to provide a method and a device for preheating an engine or an engine intake air by rapidly preheating the engine itself or the engine intake air in cold districts or in the early morning in the wintertime and thus facilitating the starting of the engine.

Another object of this invention is to provide an economical method and device in which an engine or an engine intake air is preheated by the heat generated during the absorption of hydrogen by a metal hydride to facilitate the starting of the engine, and in which the hydrogen absorbed during a period from the starting of the engine until its stopping is released from the metal hydride and the hydrogen is stored to use it for preheating the engine or the engine intake air at the time of the next starting of the engine.

Still other objects and advantages of this invention will become apparent from the following description.

These objects and advantages of this invention are achieved in accordance with this invention by a method for preheating an intake air at the time of starting an engine, which comprises (1) feeding hydrogen from a hydrogen storage container into an intake air preheater including a first metal hydride, said hydrogen having a pressure higher than the hydrogen equilibrium absorption pressure of the first metal hydride, to thereby cause hydrogen to be absorbed by the first metal hydride and elevate the temperature of the intake air preheater by the heat generated at the time of absorption, (2) heat-exchangeably contacting air to be fed into an engine with the intake air preheater kept at the elevated temperature to thereby elevate the temperature of the intake air, (3) starting the engine by using the intake air having the elevated temperature, and (4) heating the first metal hydride during the operation of the engine or during the time period from the stopping of the engine to the next starting of the engine to thereby release hydrogen, and storing the released hydrogen as hydrogen having a higher pressure than the hydrogen equilibrium absorption pressure of the first metal hydride or as a second metal hydride having a higher hydrogen equilibrium absorption pressure than the hydrogen dissociation pressure of the first metal hydride.

As a device suitable for practicing the method of this invention, the present invention provides an engine intake air preheating device comprising (A) an intake air preheater for preheating air to be fed into an engine, said preheater including a first metal hydride and being disposed within an intake air feeding tube for heat exchange with the intake air, (B) a hydrogen storage container including hydrogen having a higher pressure than the hydrogen absorption pressure of the first metal hydride or a second metal hydride having a higher hydrogen dissociation pressure than the hydrogen absorption pressure of the first metal hydride in an operating temperature range, and (C) a pipe having a valve and connecting said intake air preheater to said hydrogen storage container so that hydrogen can move between them.

The invention will be described in detail with reference to the accompanying drawings in which.

Figure 1:
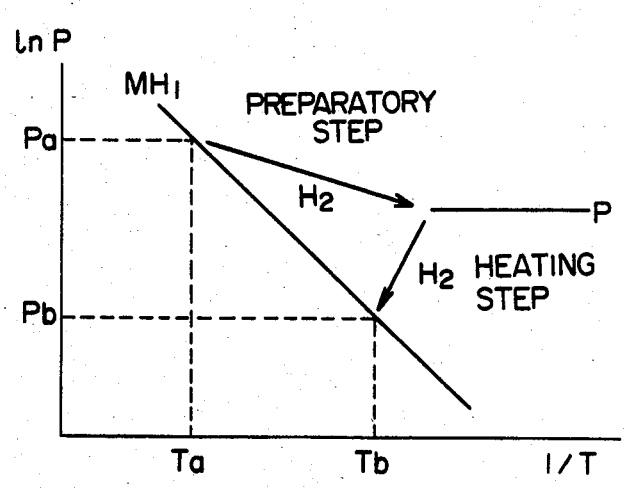
FIGS. 1 and 2 are cycle diagrams for illustrating the principle of preheating intake air in accordance with this invention.
Figure 2:
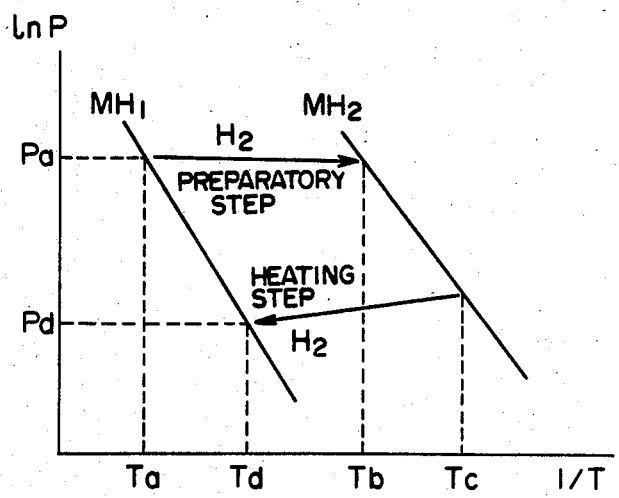

With reference to FIGS. 1 and 2, the principle of preheating intake air in accordance with this invention will be described.

According to this invention, the intake air preheater includes a first metal hydride, and hydrogen having a pressure higher than the hydrogen equilibrium absorption pressure of the first metal hydride is supplied to the first metal hydride. The hydrogen is fed from hydrogen stored in the hydrogen storage container or from a second metal hydride in the storage container which has a higher hydrogen equilibrium dissociation pressure than the hydrogen absorption pressure of the first metal hydride at the operating temperatures.

FIG. 1 is a cycle diagram for the case in which hydrogen is stored in the hydrogen storage container, and FIG. 2 is a cycle diagram for the case in which the second metal hydride is stored in the hydrogen storage container. In FIGS. 1 and 2, the abscissa represents the reciprocal of the absolute temperature T, and the ordinate, the natural logarithm of the hydrogen equilibrium pressure P of the metal hydride. In FIG. 1, a first metal hydride MH1 included in the intake air preheater has a lower hydrogen equilibrium absorption pressure Pb than the hydrogen pressure P of the inside of the hydrogen storage container at the preheating temperature Tb of the intake air in the intake air feed tube at the time of starting the engine, and a higher hydrogen equilibrium dissociation pressure Pa than the hydrogen pressure P of the hydrogen storage container at the temperature Ta of the intake air during normal operation.

Thus, when hydrogen having the pressure P is supplied to the first metal hydride MH1 at the time of starting the engine, MH1 absorbs hydrogen to generate heat. This heat warms the intake air which makes heat-exchangeable contact with the intake air preheater including MH1, and elevates the temperature of the intake air to Tb (heating step). On the other hand, at the temperature Ta of the intake air during normal operation after the starting of the engine, the hydrogen equilibrium dissociation pressure Pa of MH1 is higher than the hydrogen pressure P. Hence, MH1 releases hydrogen and forms hydrogen for use in the next starting of the engine (preparatory step).

The first metal hydride MH1 included in the intake air preheater in FIG. 2 has a lower hydrogen equilibrium absorption pressure Pd than the hydrogen equilibrium dissociation pressure at atmospheric temperature Tc of the second metal hydride MH2 included in the hydrogen storage container at the preheating temperature Td at the time of starting the engine. On the other hand, at the temperature Ta of the intake air during normal operation, the first metal hydride MH1 has a higher hydrogen equilibrium dissociation pressure Pa than the hydrogen equilibrium absorption pressure at the ambient temperature Tb of MH2.

Accordingly, at the time of starting the engine, hydrogen is fed to the first metal hydride MH1 from the second metal hydride MH2, and MH1 absorbs hydrogen and generates heat. This heat warms the intake air which makes heat-exchangeable contact with the intake air preheater including MH1 and elevates the temperature of the intake air to Td (heating step).

On the other hand, since after the starting of the engine, the hydrogen equilibrium dissociation pressure Pa of MH1 at the intake air temperature Ta during normal operation is higher than the hydrogen equilibrium absorption pressure of MH2 at the ambient temperature Tb, MH1 releases hydrogen endothermically. The released hydrogen is absorbed by MH2 for use in the next starting of the engine (preparatory step).

Figure 3:
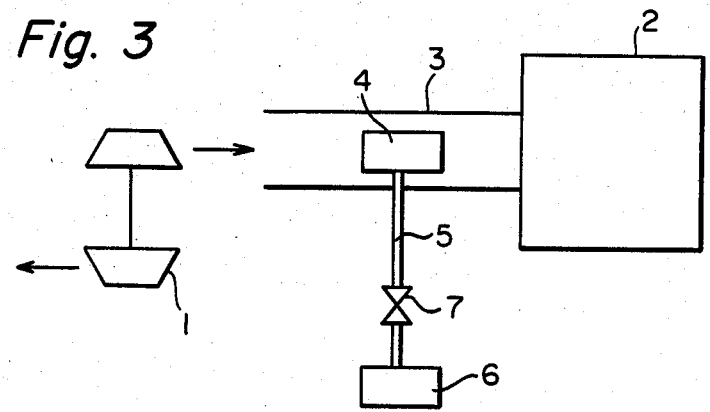
FIGS. 3, 4 and 5 are views showing the concepts of different embodiments of the engine intake air preheating device of this invention.

FIG. 3 is a view showing the concept of the engine intake air preheating device in accordance with this invention. In an intake air feeding tube 3 for feeding air to an engine 2 from a turbocharger 1, an intake air preheater 4 including the first metal hydride MH1 is mounted for heat-exchange with the air to be taken into the engine. A hydrogen storage container 6 is connected to the preheater through a pipe 5. Hydrogen is included in the hydrogen storage container 6. Or a second metal hydride (MH2) having a higher hydrogen equilibrium dissociation pressure than MH1 in an operating temperature range is included in the hydrogen storage container 6. By a hydrogen stream flowing valve 7 in the pipe 5, the hydrogen storage container 6 communicates with the intake air preheater 4 during the heating step and the preparatory step carried out as stated hereinabove. The hydrogen storage container 6 is disposed at a suitable position of a car body, and is in heat exchange relationship with the outer atmosphere or with the car body.

Figure 4:
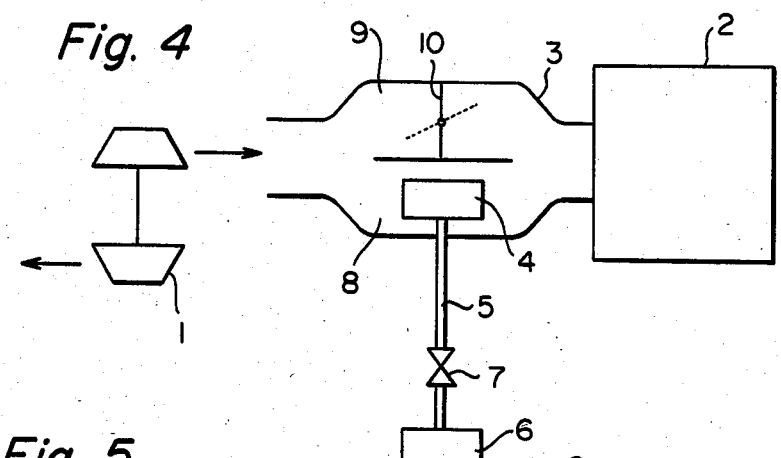

FIG. 4 is a view showing the concept of another embodiment of the device in accordance with this invention, in which the same members of the device are designated by the same reference numerals as in FIG. 3. It will be easily understood that this embodiment differs from the device shown in FIG. 3 in that the intake air feed tube 3 is divided into two. Specifically, the intake air feed tube 3 is divided into an intake air preheating tube 8 and an intake air control tube 9. The same intake air preheater 4 as in the device of FIG. 3 is mounted on the intake air preheating tube 8. The air intake control tube 9 has a control valve 10 for controlling the flow of the intake air from the turbocharger 1 to the engine. During the starting of the engine, the control valve 10 is closed to pass the intake air forcibly through the intake air preheating tube to preheat the intake air. After the engine has attained a normal operating condition, the control valve 10 is opened to pass the intake air without a pressure drop. As required, this control valve may be a manually operable valve or a solenoid valve.

Figure 5:
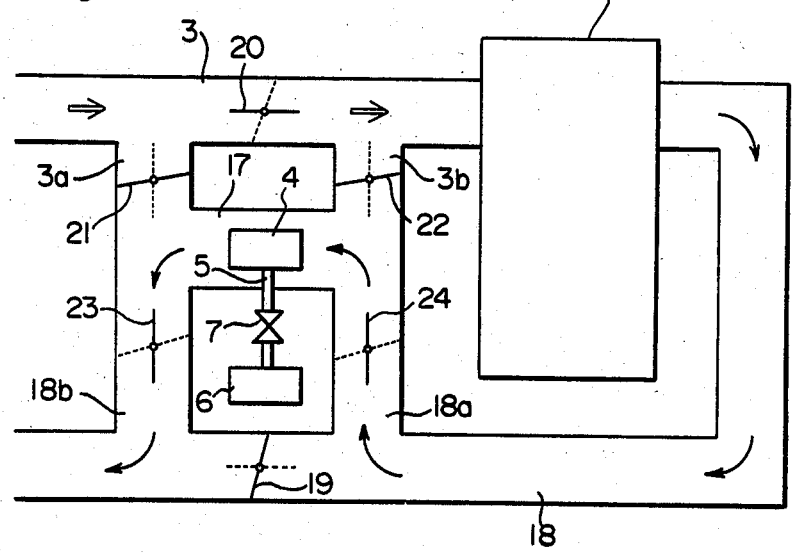

FIG. 5 is a view showing the concept of still another embodiment of the device in accordance with this invention, in which the exhaust gas of the engine is used as a heat source for heating the metal hydride in the intake air preheater during the preparatory step. A branched tube 3a from the intake air feed tube 3 leading to the engine 2 is connected to a branched tube 18b from an engine exhaust tube 18. Another branched tube 3b from the intake air feed tube 3 is connected to another branched tube 18a from the engine exhaust tube 18. Furthermore, an associating tube 17 is formed between the pair of branched tubes 3a and 3b In order that the intake air and the engine exhaust gas may flow into the associating tube 17, control valves 19 and 20 in the engine exhaust tube 18 and the intake air feed tube 3, control valves 21 and 22 in the branched tubes 3a and 3b and control valves 24 and 23 in the branched tubes 18a and 18b are disposed respectively in such a manner that they can be opened and closed. The intake air preheater 4 is further disposed in the associating tube 17. In the same way as above, the hydrogen storage container 6 is connected to the intake air preheater 4 by means of the pipe 5 having the hydrogen flow valve 7.

In the heating step in accordance with this device, the control valve 19 in the engine exhaust tube 18 is opened and the control valves 24 and 23 in the branched tubes 18a and 18b are closed. At the same time, the control valve 20 in the intake air feed tube 3 is closed and the control valves 21 and 22 in the branched tubes 18a and 18b are opened. These are shown by broken lines at the control valves. As a result, the intake air flows into the associating tube 17 and is heated by the intake air preheater 4. On the other hand, in the preparatory step, the control valve 19 in the engine exhaust tube 18 is closed and the control valves 23 and 24 at the branched tubes 18a and 18b are opened. At the same time, the control valve 20 in the intake air feed tube 3 is opened, and the control valves 21 and 22 in the branched tubes 3a and 3b are closed. These are shown by the solid lines in the control valves. As a result, the exhaust gas flows into the associating tube 17 and heats the intake air preheater 4.

It is believed that the foregoing description with reference to FIGS. 3 to 5 clarifies the relation of the method and device of this invention to FIGS. 1 and 2. A further description will, however, be made with reference to the device of FIG. 3 as an example. In relation to FIG. 1, the device of FIG. 3 will be described. When the hydrogen flow valve 7 is opened at the time of starting the engine in order to perform the heating step, hydrogen in the hydrogen storage container 6 flows into the intake air preheater 4. MH1 absorbs this hydrogen at temperature Tb and generates heat and thus heats the intake air in the intake air feed tube 3. In the heating step, the hydrogen pressure in the hydrogen storage container is decreased to some extent. When the engine has reached a normal operating conditions in this manner, the intake air elevated to temperature Ta by being compressed by the turbocharger 1 has a higher temperature than the intake air preheater 4 and the intake air preheater is then heated. Thus, MH1 included in the preheater endothermically releases hydrogen at temperature Ta. This hydrogen returns to the hydrogen storage container 6 via the pipe 5 and gains the original pressure. After this preparatory step, the hydrogen flow valve 7 is closed, and the device is ready for the next starting of the engine.

Now, in relation to FIG. 2, the device of FIG. 3 will be described. When in the heating step, the hydrogen flow valve 7 is opened at the time of starting the engine, MH2 in the hydrogen storage container 6 releases hydrogen while absorbing heat from the atmosphere at temperature Tc. This hydrogen is absorbed by MH1 in the intake air preheating tube 4 at temperature Td to generate heat. In the preparatory step, MH1 in the intake air preheater 4 is heated by the compressed intake air at temperature Ta from the turbocharger 1 which has reached an ordinary operating condition. As a result, MH1 releases hydrogen at temperature Ta, and this hydrogen is absorbed by MH2 at temperature Tb. The heat generated by MH2 at this time is dissipated into the atmosphere or the car body. Thereafter, the hydrogen flow valve 7 is closed, and the device is ready for the next starting of the engine.

Accordingly, if the hydrogen flow valve 7 is constructed of a solenoid valve and adapted to be opened upon the starting of the engine and closed upon the stopping of the engine, the device of this invention can be easily operated without the need for any other control instrument.

In the device of this invention, for example the device shown in FIG. 5, an electric heater (not shown) may be provided in the intake air preheater 4. In this case, hydrogen may be returned from MH1 to MH2 by the electric heater or by the aid of it. Hence, the preparatory step can be completed surely even if the running distance of the automobile is short. Furthermore, the metal hydride can be selected from a broad range of metal hydrides.

Figure 6:
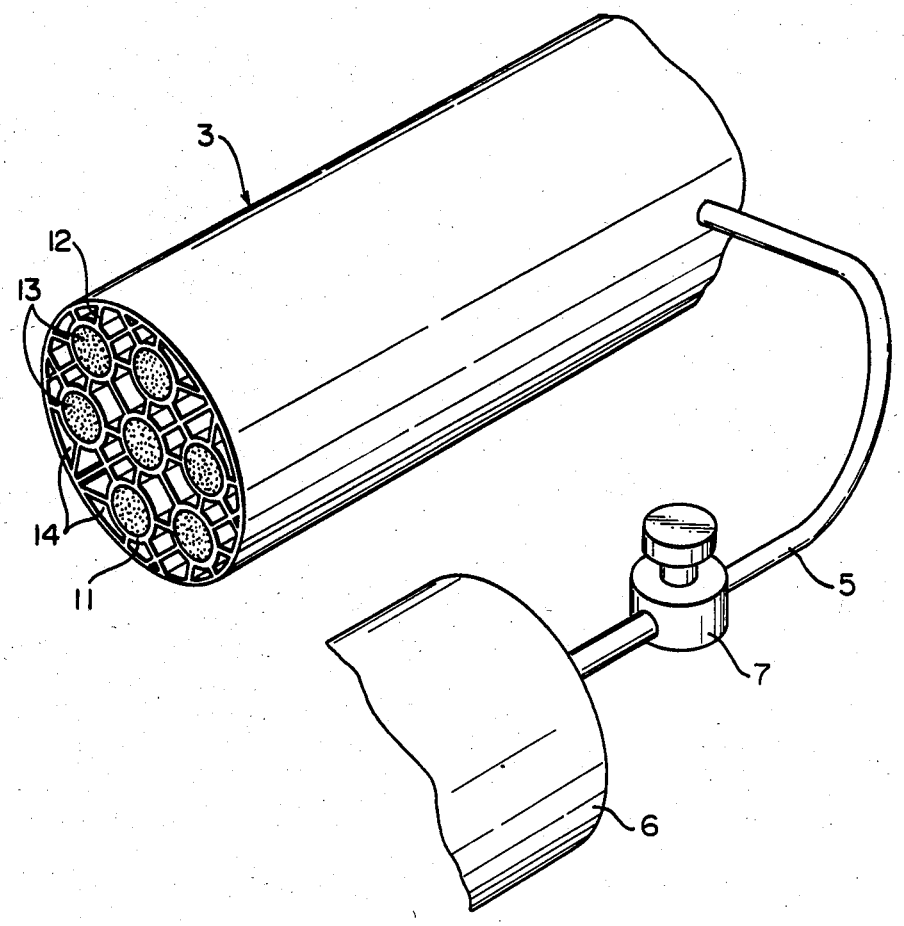
FIGS. 6 and 7 are partially sectional brokenaway views of an intake air feeding tube illustrating the principal parts of one embodiment of the intake air preheater.

FIG. 6 shows one embodiment of the principal parts of the intake air preheater in accordance with this invention. One or a plurality of cylindrical containers 11 are disposed within the intake air feed tube 3 and fixed to each other or to the wall of the intake air feed tube. A metal hydride 13 is filled in the inside of each of the containers. The containers are connected to the hydrogen storage container 6 by means of the pipe 5 having the hydrogen flow valve 7. The spaces among the cylindrical containers 11 form passages 14 for the intake air.

Figure 7:
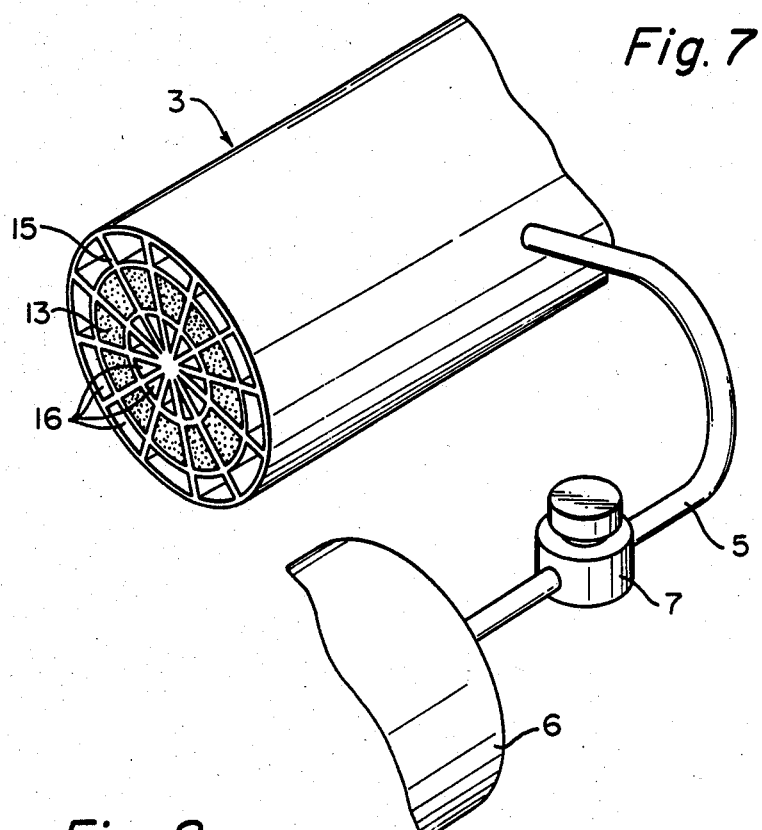

FIG. 7 shows another embodiment of the principal parts. Fins 15 are radially formed in the intake air feed tube 3, and the feed tube is formed in a multitubular structure with the individual tube members being concentric with each other. For example, as shown, a metal hydride 13 is filled in annular portions between tube member walls and the tube members are connected to the pipe 5. The other space portions form passages 16 for the intake air.

In the foregoing description, air compressed and heated by the turbocharger or the engine exhaust gas is utilized as a heat source for heating the metal hydride MH2 in the intake air preheater in the preparatory step. It will be easily understood that when the device of this invention requires a heat source, the heat source is not limited to those stated above, and all heat generated by the operation of the engine can be utilized. Examples of such heat sources may be the engine body, the engine cooling water and the engine oil.

Now, the device of this invention used for preheating an engine by the heat generated by a metal hydride at the time of absorbing hydrogen will be described.

The device of this invention for preheating an engine comprises (A') an engine preheater for preheating an engine, said preheater including a first metal hydride and being mounted on the engine for heat-exchange with the engine, (B) a hydrogen storage container including hydrogen having a higher pressure than the hydrogen absorption pressure of the first metal hydride or a second metal hydride having a higher hydrogen dissociation pressure than the hydrogen absorption pressure of the first metal hydride in an operating temperature range, and (C) a pipe having a valve and connecting said intake air preheater to said hydrogen storage container so that hydrogen can move between them.

The structure of the engine preheating device of this invention is the same as the engine intake air preheating device described above except that the structure (A') of the former differs from the structure (A) of the latter. Hence, the operating principle of the engine preheating device of this invention can be easily understood from the foregoing description given with reference to FIGS. 1 and 2 by reading "engine" for "intake air".

Figure 8:
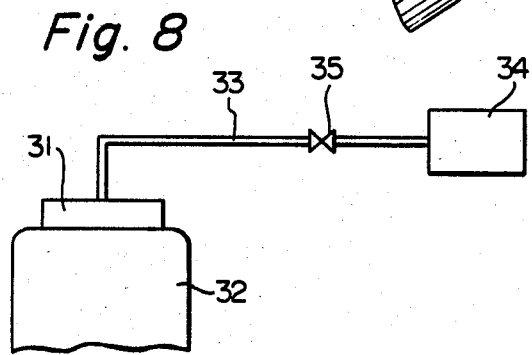
FIGS. 8 and 9 are views showing the concepts of different embodiments of an engine preheating device in accordance with this invention.

FIG. 8 is a view showing the engine preheating device in accordance with this invention. An engine preheater 31 including a first metal hydride MH1 is mounted on an engine in close contact with an engine head 32 so that it permits heat-exchange with the engine head 32. A hydrogen storage container 34 is connected to this preheater through a pipe 33. Hydrogen is filled in the hydrogen storage container 34, or it includes a second metal hydride MH2 having a higher hydrogen equilibrium dissociation pressure in the operating temperature range. The hydrogen storage container 34 is caused to communicate with the engine preheater 31 while the aforesaid heating step and the preparatory step are carried out by a hydrogen flow valve 35 of the pipe 33. The hydrogen storage container 34 is disposed at a suitable position of a car body and is in heat exchange relationship, for example, with the outer atmosphere or the car body.

Figure 9:
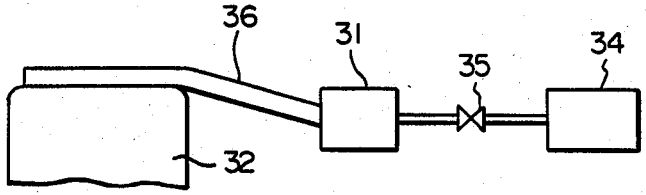

FIG. 9 is a view showing the concept of another embodiment of the device of this invention. The same members as in FIG. 8 are represented by the same reference numerals. It will be easily understood that a so-called heat pipe 36 having good thermal conductivity is fixed closely to the engine head 32, and the engine preheater 31 is connected to the heat pipe 36. Otherwise, the structure of the device is the same as the device shown in FIG. 8. Heat exchange between the engine preheater 31 and the engine head 32 is carried out through the heat pipe 36.

If the hydrogen flow valve is a solenoid valve and adapted to be opened upon the starting of the engine and closed upon the stopping of the engine, the engine preheater of the invention can be easily operated without the need for another controlling instrument as in the case of the engine intake air preheater of this invention.

The operation of the intake air preheating device of this invention will be described specifically.

When in the device which performs the operation shown in FIG. 1, 1 kg of LaNi$_5$ was used as MH1 in the intake air preheater and the capacity of the hydrogen storage container was adjusted to 37 liters (Tb=about 50° C., Pb=about 6 atmospheres, Ta=about 70° C., Pa=about 10 atmospheres), the temperature of the intake air could be elevated to about 15° C. in several seconds (the temperature of the atmosphere at the time of starting the engine in the heating step was $-25°$ C.). When the intake air was preheated by jointly using a conventional electric heater capable of giving a temperature increase of 25° C., it could be heated to about 40° C. In the preparatory step, the intake air was compressed by the turbocharger and attained a temperature of 50° to 70° C., hydrogen could be released from the metal hydride and the device was ready for the next starting of the engine.

When in the device which performs the operation shown in FIG. 2, 1 kg of CeCo$_5$ was used as MH1 and 1 kg of MmNi$_5$ (Mm=misch metal) was used as MH2 (Tc=about $-30°$ C., Tb=about 0° C., Td=about 30° C., Ta=about 50° C., Pd=about 1 atmosphere, Pa=about 10 atmosphere), the temperature of the intake air could be elevated to about 5° C. within several seconds (the temperature of the atmosphere at the start of the engine was $-25°$ C.). When an electric heater was jointly used, the intake air could be heated to about 30° C. After the engine attained a normal operating condition, MH1 in the intake air preheater could be heated by the intake air at 50° to 70° C. and hydrogen could be released from it. Hence, the device was ready for the next starting of the engine.

Assuming that the weight of the engine required to be preheated was 50 kg and its heat capacity was 5 kcal/°C., the operation of the engine preheating device of this invention will be specifically described below.

When in the device which performs the operation shown in FIG. 1, 6 kg of ZrMn$_2$ was used as MH1 in the engine preheater and the capacity of the hydrogen storage container was adjusted to 85 liters (Tb=about 30° C., Pd=about 1 atmosphere, Ta=about 130° C., Pa=about 10 atmospheres), the temperature of the engine which was $-25°$ C. at the time of starting the engine in the heating step could be elevated to about 25° C. within several seconds. In the preparatory step, the engine head attained a temperature of about 130° C., and hydrogen could be easily released from the metal hydride.

When in the device which performs the operation shown in FIG. 2, 6 kg of CaNi$_5$ was used as MH1 and 6 kg of MmNi$_5$ (mm=misch metal) was used as MH2 (Tc=about $-25°$ C., Tb=about 0° C., Td=about 30° C., Ta=about 130° C., Pd=about 1 atmosphere, Pa=about 10 atmospheres), the temperature of the engine which was $-25°$ C. at the time of its starting could be elevated to about 25° C. within several seconds. After the engine attained a normal operating condition, the engine head heated the MH1 in the preheater as described above, and hydrogen could be released from MH1.

Preferred first metal hydrides for use in this invention include, for example, LaNi$_{5-x}$Al$_x$ ($1 \geq x \geq 0$), CeCo$_5$, ZrMn$_2$ and CaNi$_5$. Preferred second metal hydrides for use in this invention include, for example, MmNi$_5$ (Mm=misch metal).

The combination of the first metal hydride and the second metal hydride can be easily determined from the temperature dependences of the hydrogen equilibrium dissociation-absorption pressures of these metal hydrides.

Since according to this invention, an engine or an engine intake air is preheated by utilizing a metal hydride which absorbs hydrogen, the device is light in weight and can perform preheating rapidly to a higher temperature. Accordingly, the device of the invention greatly facilitates the starting of engines in cold districts and in the early morning in the wintertime.

What is claimed is:

1. An internal combustion engine intake air preheating device comprising:
    an intake air preheater for preheating air to be fed into an engine, said preheater including a first metal hydride and being disposed within an intake air feeding tube for heat exchange with the intake air;
    a hydrogen storage container including hydrogen at a predetermined pressure or a second metal hydride, said predetermined pressure being higher than, or said second metal hydride having a higher hydrogen dissociation pressure than, the hydrogen absorption pressure of said first metal hydride at the preheating temperature at the time of starting the engine, and said predetermined pressure being lower than or said second metal hydride having a hydrogen absorption pressure lower than the hydrogen dissociation pressure of said metal hydride at the temperature of the intake air during normal operation of the engine;
    a pipe having a valve and connecting said intake air preheater to said hydrogen storage container for permitting hydrogen to move from said hydrogen storage container to said preheater when the preheater is at the preheating temperature and from said preheater to said storage container when said preheater is at said temperature of the intake air during normal operation of the engine.

2. An engine preheating device comprising:
    an engine preheater for preheating an engine, said preheater including a first metal hydride and being mounted on the engine for heat exchange with the engine;
    a hydrogen storage container including hydrogen at a predetermined pressure or a second metal hydride, said predetermined pressure being higher than, or said second metal hydride having a higher hydrogen dissociation pressure than, the hydrogen absorption pressure of said first metal hydride at the preheating temperature at the time of starting the engine, and said predetermined pressure being lower than or said second metal hydride having a hydrogen absorption pressure lower than the hydrogen dissociation pressure of said first metal hydride at the temperature of the engine during normal operation of the engine;

a pipe having a valve and connecting said engine preheater to said hydrogen storage container for permitting hydrogen to move from said hydrogen storage container to said engine preheater when the engine preheater is at the preheating temperature and from said engine preheater to said storage container when said engine preheater is at said temperature of the engine during normal operation of the engine.

3. The device of claim 1 wherein the first metal hydride is selected from the group consisting of $LaNi_{5-x}Al_x$ ($1 \geq x \geq 0$), $CeCo_5$, $ZrMn_2$ and $CaNi_5$.

4. The device of claim 1 wherein the second metal hydride is $MmNi_5$ wherein Mm is misch metal.

5. The device of claim 2 wherein the first metal hydride is selected from the group consisting of $LaNi_{5-x}Al_x$ ($1 \geq x \geq 0$), $CeCo_5$, $ZrMn_2$ and $CaNi_5$.

6. The device of claim 2 wherein the second metal hydride is $MmNi_5$ wherein Mm is misch metal.

7. A method for preheating intake air at the time of starting an internal combustion engine, which comprises:

at the time of starting the engine, feeding hydrogen from a hydrogen storage container having therein hydrogen at a predetermined pressure or a second metal hydride having hydrogen absorbed therein into an intake air preheater having therein a first metal hydride, said predetermined pressure being higher than, or said second metal hydride having a higher hydrogen dissociation pressure than, the hydrogen absorption pressure of said first metal hydride at the preheating temperature at the time of starting the engine, the feeding step causing hydrogen to be absorbed by the first metal hydride and elevate the temperature of the intake air preheater by the heat generated at the time of absorption;

heat-exchangeably contacting air to be fed to the engine with the intake air preheater at the elevated temperature to thereby elevate the temperature of the intake air;

then starting the engine by using the thus heated intake air; and heating the first metal hydride during the operation of the engine or during the time period from the stopping of the engine to the next starting of the engine to thereby release hydrogen from said first metal hydride, and storing the released hydrogen at the hydrogen dissociation pressure of said first metal hydride or by absorbing it in a second metal hydride having a hydrogen absorption pressure lower than the hydrogen dissociation pressure of said first metal hydride at the temperature to which said first metal hydride has been heated.

8. The method as claimed in claim 7 in which the step of heating the first metal hydride comprises heating it with intake air compressed and heated by a turbosupercharger or with engine exhaust gas.

* * * * *